(12) United States Patent
Griebel

(10) Patent No.: US 10,472,816 B2
(45) Date of Patent: Nov. 12, 2019

(54) BACKFLOW VALVE ASSEMBLY

(71) Applicant: Justin Griebel, Knox, PA (US)

(72) Inventor: Justin Griebel, Knox, PA (US)

( * ) Notice: Subject to any disclaimer, the term of this patent is extended or adjusted under 35 U.S.C. 154(b) by 157 days.

(21) Appl. No.: 15/660,172

(22) Filed: Jul. 26, 2017

(65) Prior Publication Data

US 2019/0032322 A1    Jan. 31, 2019

(51) Int. Cl.
    *E03F 5/042* (2006.01)
    *E03F 5/04* (2006.01)
    *E03F 5/06* (2006.01)
    *F16K 31/20* (2006.01)
    *F16K 15/04* (2006.01)

(52) U.S. Cl.
    CPC ............ *E03F 5/042* (2013.01); *E03F 5/0407* (2013.01); *E03F 5/06* (2013.01); *F16K 15/042* (2013.01); *F16K 31/20* (2013.01); *E03F 2005/0417* (2013.01); *Y10T 137/7404* (2015.04)

(58) Field of Classification Search
    CPC . E03F 5/0407; E03F 5/042; E03F 5/06; E03F 2005/0417; F16K 31/20; F16K 15/042; Y10T 137/7404
    See application file for complete search history.

(56) References Cited

U.S. PATENT DOCUMENTS

| 3,610,275 | A | | 10/1971 | Determan | |
|---|---|---|---|---|---|
| 4,224,961 | A | | 9/1980 | Schnabel | |
| 4,310,038 | A | * | 1/1982 | Yule | G01F 11/32 |
| | | | | | 141/351 |
| 5,419,359 | A | | 5/1995 | Kor | |
| 5,524,495 | A | * | 6/1996 | Dudley | F16K 31/22 |
| | | | | | 73/863.52 |
| 6,129,110 | A | * | 10/2000 | Kolb | F16K 31/18 |
| | | | | | 137/391 |
| 6,131,605 | A | * | 10/2000 | Kothe | B65D 88/747 |
| | | | | | 137/397 |
| 6,327,920 | B1 | * | 12/2001 | Clark, II | G01N 1/10 |
| | | | | | 73/864.51 |
| D459,787 | S | | 7/2002 | Kitazawa et al. | |
| 8,627,847 | B2 | | 1/2014 | Montague | |
| 9,133,944 | B2 | | 9/2015 | Haeckel et al. | |
| 2006/0081293 | A1 | | 4/2006 | Santa Cruz et al. | |
| 2009/0000667 | A1 | * | 1/2009 | Bottura | F16K 15/042 |
| | | | | | 137/202 |
| 2010/0089838 | A1 | | 4/2010 | Soderstrom | |

FOREIGN PATENT DOCUMENTS

WO    WO2007146083    12/2007

* cited by examiner

*Primary Examiner* — Mary E McManmon
*Assistant Examiner* — Patrick C Williams

(57) ABSTRACT

A backflow valve assembly for preventing gas and backup waste from escaping a floor drain includes a tube that is configured to fluidically couple to a drain line. A pipe is coupled to and axially positioned in the tube. The pipe has upper and lower ends that are closed. At least one gasket is coupled to an inner surface of the pipe and defines upper and lower chambers. Penetrations are positioned through the pipe to allow flow of gasses and liquids into the pipe. First and second balls, which are less dense than water, are positioned in the upper and lower chambers, respectively. The first ball prevents escape of the gasses from the tube. The first ball floats to open the gasket to permit the flow of the liquids to the drain line. The second ball floats to close the gasket to prevent escape of waste from the tube.

7 Claims, 3 Drawing Sheets

BACKFLOW VALVE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to valve assemblies and more particularly pertains to a new valve assembly for preventing gas and backup waste from escaping a floor drain.

(2) Description of Related Art Including Information Disclosed Under 37 CFR 1.97 and 1.98

The prior art relates to valve assemblies.

BRIEF SUMMARY OF THE INVENTION

An embodiment of the disclosure meets the needs presented above by generally comprising a tube that is configured to fluidically couple to a drain line. A pipe is coupled to and axially positioned in the tube. The pipe has upper and lower ends that are closed. At least one gasket is coupled to an inner surface of the pipe and defines upper and lower chambers. Penetrations are positioned through the pipe to allow flow of gasses and liquids into the pipe. First and second balls, which are less dense than water, are positioned in the upper and lower chambers, respectively. The first ball prevents escape of the gasses from the tube. The first ball floats to open the at least one gasket to permit the flow of the liquids to the drain line. The second ball floats to close the at least one gasket to prevent escape of waste from the tube.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
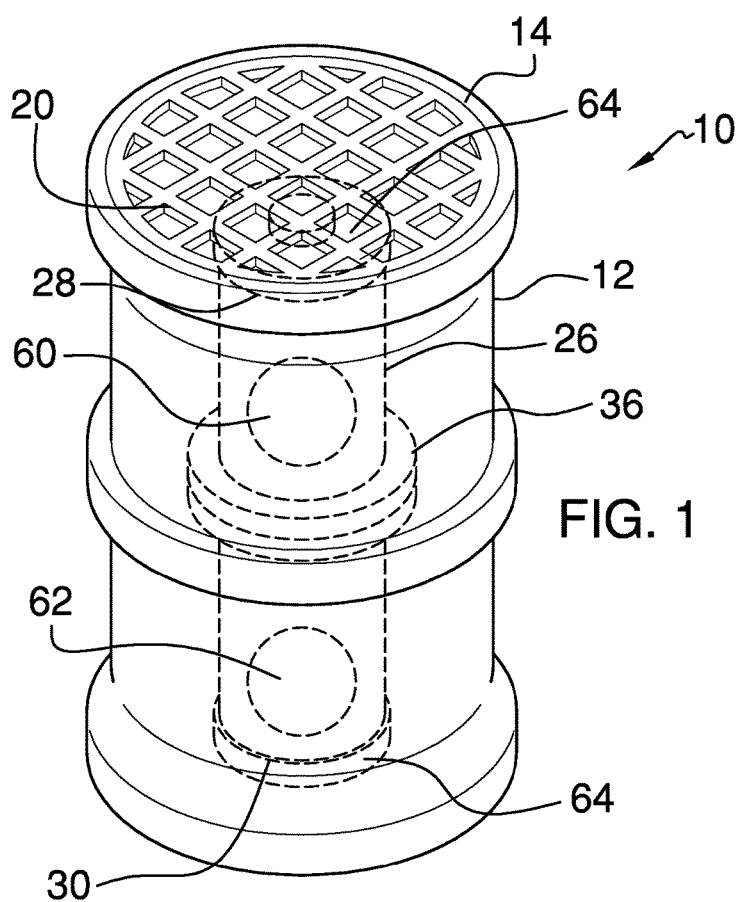
FIG. 1 is an isometric perspective view of a backflow valve assembly according to an embodiment of the disclosure.
Figure 2:
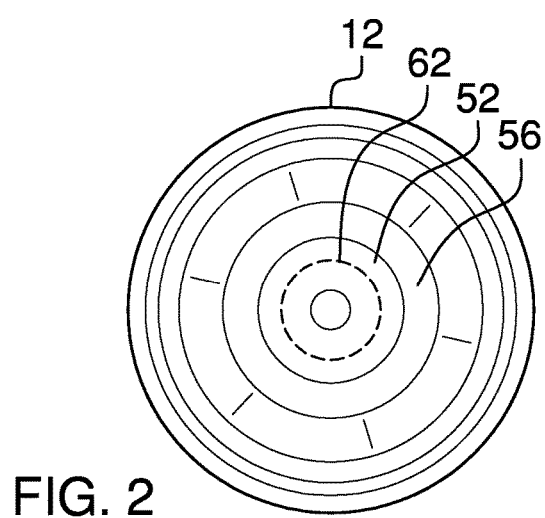
FIG. 2 is a bottom view of an embodiment of the disclosure.
Figure 3:
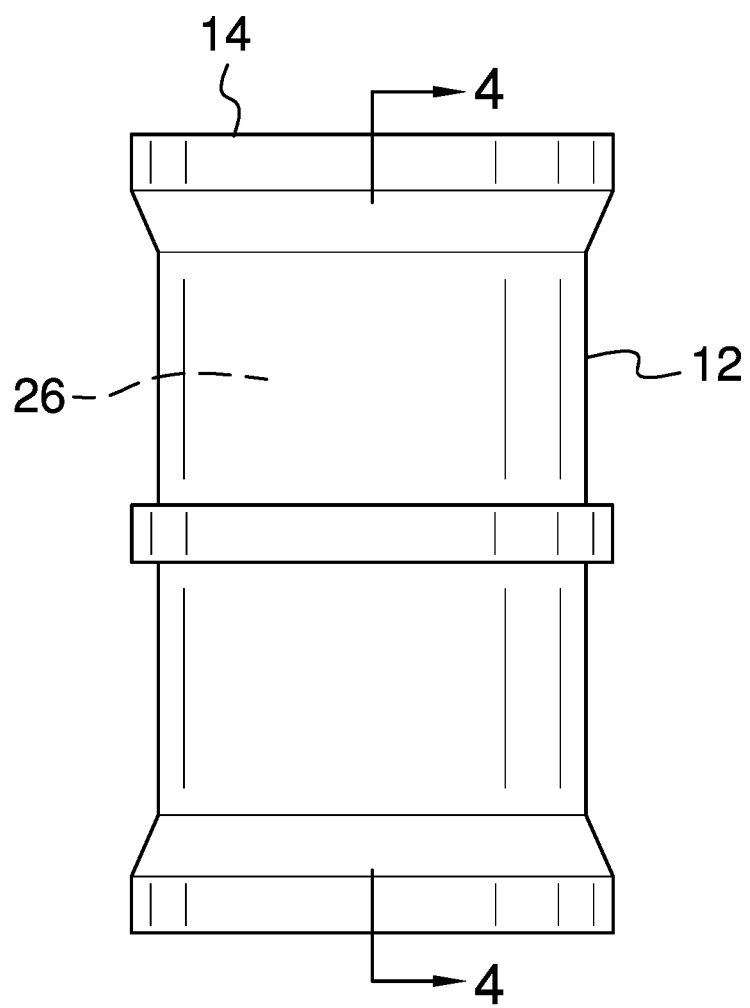
FIG. 3 is a side view of an embodiment of the disclosure.
Figure 4:
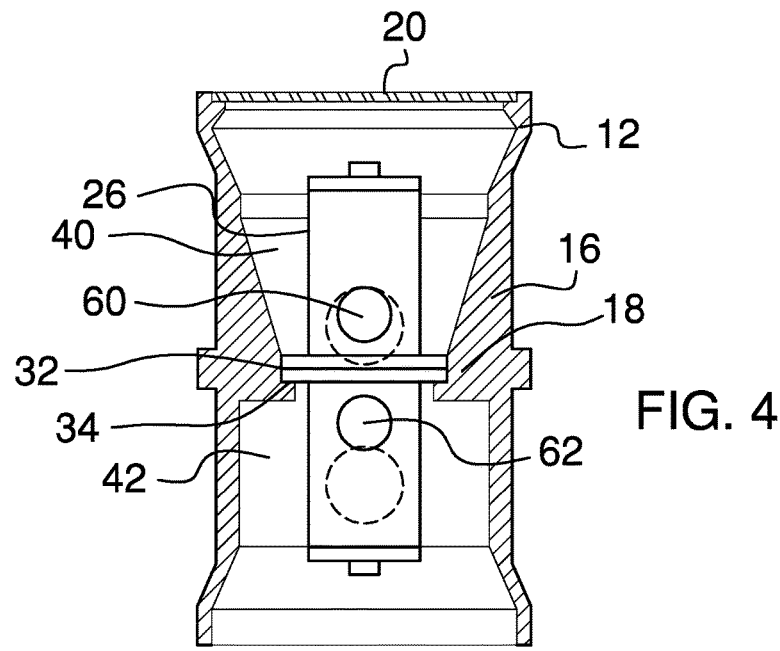
FIG. 4 is a cross-sectional view of an embodiment of the disclosure.
Figure 5:
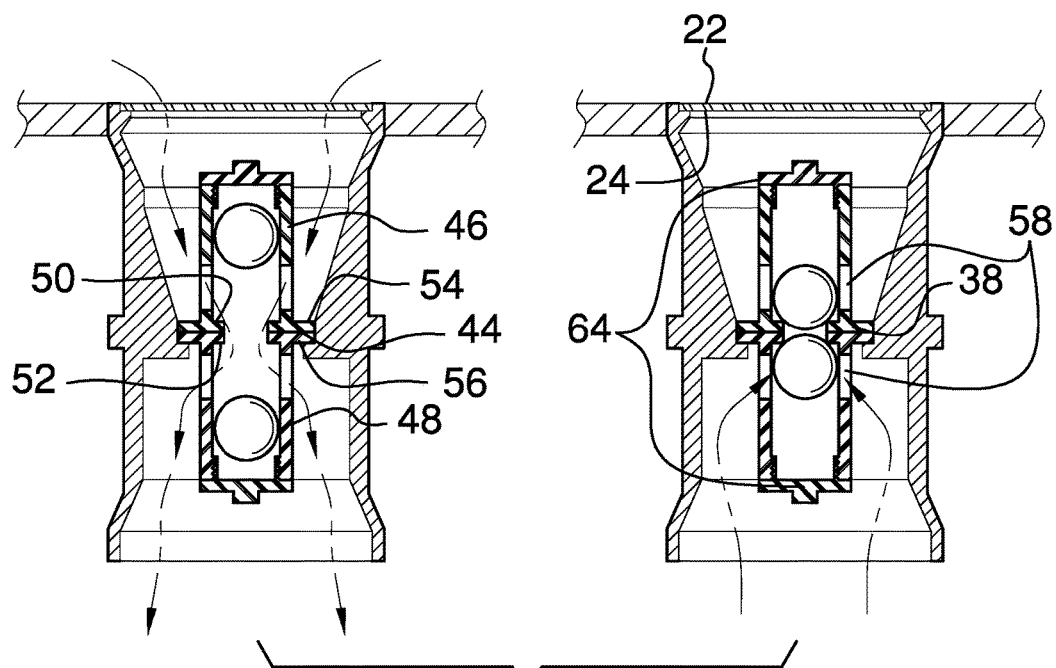
FIG. 5 is a detail view of an embodiment of the disclosure.

With reference now to the drawings, and in particular to FIGS. 1 through 5 thereof, a new valve assembly embodying the principles and concepts of an embodiment of the disclosure and generally designated by the reference numeral 10 will be described.

As best illustrated in FIGS. 1 through 5, the backflow valve assembly 10 generally comprises a tube 12 that is configured to fluidically couple to a drain line. The tube 12 has a top 14 that is open. In one embodiment, the tube 12 is circularly shaped when viewed longitudinally. The tube 12 has an inner wall 16. In one embodiment, the inner wall 16 is thinner proximate to the top 14 of the tube 12 than proximate to a midpoint 18 of the tube 12. The inner wall 16 tapers from the midpoint 18 to the top 14.

The assembly 10 comprises a grate 20 that is complementary to the top 14 of the tube 12. The grate 20 is configured to selectively couple to the top 14 of the tube 12. A first recess 22 extends into the tube 12 from the top 14 and defines a first ridge 24. The first recess 22 is complementary to the grate 20. The first recess 22 is positioned to insert the grate 20 to rest on the first ridge 24 to couple the grate 20 to the tube 12.

A pipe 26 is coupled to and axially positioned in the tube 12. The pipe 26 has an upper end 28 and a lower end 30. The upper end 28 and the lower end 30 are closed. In one embodiment, the pipe 26 is circularly shaped when viewed longitudinally. The pipe 26 is internally threaded proximate to the upper end 28 and the lower end 30.

A second recess 32 is positioned in the inner wall 16 of the tube 12 proximate to the midpoint 18 and defines a second ridge 34. At least one flange 36 is coupled to and extends radially from the pipe 26. The at least one flange 36 is complementary to the second recess 32. The second recess 32 is positioned to insert the at least one flange 36. The at least one flange 36 is positioned to sealably couple to the inner wall 16 and the second ridge 34 to couple the pipe 26 to the tube 12.

At least one gasket 38 is coupled to an inner surface of the pipe 26 and defines an upper chamber 40 and a lower chamber 42.

In one embodiment, a separation 44 is positioned radially through the pipe 26 substantially equally distant from the upper end 28 and the lower end 30 so that the pipe 26 comprises first section 46 and a second section 48. The first section 46 and the second section 48 are separable to be inserted into and removed from the tube 12. In this embodiment, the at least one gasket 38 comprises a first gasket 50 and a second gasket 52 and the at least one flange 36 comprises a first flange 54 and a second flange 56. The first gasket 50 and the first flange 54 are coupled to the first section 46 of the pipe 26. The second gasket 52 and the second flange 56 are coupled to the second section 48 of the pipe 26.

A plurality of penetrations 58 is positioned through the pipe 26. The penetrations 58 are configured to allow flow of gasses and liquids from the tube 12 into the pipe 26. In one embodiment, the penetrations 58 are positioned proximate to and bracket the at least one gasket 38. The pipe 26 is solid distal to the at least one gasket 38.

A first ball 60 and a second ball 62 are positioned in the upper chamber 40 and the lower chamber 42, respectively. The first ball 60 and the second ball 62 are less dense than water. The first ball 60 is configured to seat in the at least one gasket 38, in the absence of liquids, to close the at least one gasket 38 to prevent the gasses from escaping through the top 14 of the tube 12. The first ball 60 is configured to float in the presence of liquids that enter the tube 12 from the top 14 to open the at least one gasket 38 so that the liquids flow to the drain line. The second ball 62 is configured to float in the presence of liquids that enter the tube 12 from the drain line to close the at least one gasket 38 to prevent the liquids from flowing through the top 14 of the tube 12. In one embodiment, the first ball 60 and the second ball 62 are substantially circumferentially complementary to the pipe 26.

A pair of caps 64 that is complementary to the upper end 28 and the lower end 30 of the pipe 26 is selectively couplable singly to the upper end 28 and the lower end 30 of the pipe 26. The upper end 28 and the lower end 30 are closed to retain the first ball 60 and the second ball 62 within the pipe 26.

In use, the first section 46 and the second section 48 of the pipe 26 are separable to insert into and remove from the tube 12. The pipe 26 is internally threaded so that the caps 64 are positioned to selectively couplable singly to the upper end 28 and the lower end 30 of the pipe 26 to close the upper end 28 and the lower end 30. The first ball 60 and the second ball 62 are retained within the pipe 26. The second recess 32 is positioned to insert the at least one flange 36. The at least one flange 36 is positioned to sealably couple to the inner wall 16 and the second ridge 34 to couple the pipe 26 to the tube 12. The first recess 22 is positioned to insert the grate 20 to couple the grate 20 to the tube 12. The penetrations 58 are configured to allow the flow of the gasses and the liquids from the tube 12 into the pipe 26. The first ball 60 is configured to seat in the at least one gasket 38, in the absence of the liquids, to close the at least one gasket 38 to prevent the gasses from escaping through the top 14 of the tube 12. The first ball 60 is configured to float in the presence of the liquids that enter the tube 12 from the top 14 to open the at least one gasket 38 so that the liquids flow to the drain line. The second ball 62 is configured to float in the presence of the liquids that enter the tube 12 from the drain line to close the at least one gasket 38 to prevent the liquids from flowing through the top 14 of the tube 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A backflow valve assembly comprising:
    a tube configured for fluidically coupling to a drain line, said tube having a top, said top being open, said tube having an inner wall, said inner wall being thinner proximate to said top of said tube than proximate to a midpoint of said tube such that said inner wall tapers from said midpoint to said top;
    a pipe coupled to and axially positioned in said tube, said pipe having an upper end and a lower end, said upper end and said lower end being closed;
    at least one gasket coupled to an inner surface of said pipe defining an upper chamber and a lower chamber;
    a plurality of penetrations positioned through said pipe;
    a first ball and a second ball, said first ball being positioned in said upper chamber, said second ball being positioned in said lower chamber, said first ball and said second ball being less dense than water;
    wherein said penetrations are positioned in said pipe such that said penetrations are configured for flowing of gasses and liquids from said tube into said pipe, wherein said first ball is positioned in said upper chamber such that said first ball is configured for seating in said at least one gasket in the absence of liquids for closing said at least one gasket for preventing the gasses from escaping through said top of said tube and for floating in the presence of liquids entering said tube from said top for opening said at least one gasket for permitting the flowing of the liquids to the drain line, wherein said second ball is positioned in said lower chamber such that said second ball is configured for floating in the presence of liquids entering said tube from the drain line for closing said at least one gasket for preventing the flowing of the liquids through said top of said tube;
    a grate complementary to and configured for selectively coupling to said top of said tube;
    a first recess extending into said tube from said top defining a first ridge, said first recess being complementary to said grate, wherein said first recess is positioned in said tube such that said first recess is positioned for inserting said grate for resting on said first ridge for coupling said grate to said tube;
    a second recess positioned in said inner wall of said tube proximate to said midpoint defining a second ridge;

at least one flange coupled to and extending radially from said pipe, said at least one flange being complementary to said second recess; and wherein said second recess is positioned in said tube such that said second recess is positioned for inserting said at least one flange such that said at least one flange is positioned for sealably coupling to said inner wall and said second ridge for coupling said pipe to said tube.

2. The assembly of claim 1, further including said tube being circularly shaped when viewed longitudinally.

3. The assembly of claim 1, further comprising:

said pipe being circularly shaped when viewed longitudinally, said pipe being internally threaded proximate to said upper end and said lower end;

a pair of caps complementary to said upper end and said lower end of said pipe such that said caps are selectively couplable singly to said upper end and said lower end of said pipe for closing said upper end and said lower end; and wherein said caps are positioned on said pipe such that said caps are positioned for retaining said first ball and said second ball within said pipe.

4. The assembly of claim 1, further including a separation positioned radially through said pipe substantially equally distant from said upper end and said lower end such that said pipe comprises first section and a second section, wherein said separation is positioned in said pipe such that said first section and said second section are separable for inserting into and removing from said tube, said at least one gasket comprising a first gasket and a second gasket, said at least one flange comprising a first flange and a second flange, said first gasket and said first flange being coupled to said first section of said pipe, said second gasket and said second flange being coupled to said second section of said pipe.

5. The assembly of claim 1, further including said penetrations being positioned proximate to and bracketing said at least one gasket such that said pipe is solid distal to said at least one gasket.

6. The assembly of claim 1, further including said first ball and said second ball being substantially circumferentially complementary to said pipe.

7. A backflow valve assembly comprising:

a tube configured for fluidically coupling to a drain line, said tube having a top, said top being open, said tube being circularly shaped when viewed longitudinally, said tube having an inner wall, said inner wall being thinner proximate to said top of said tube than proximate to a midpoint of said tube such that said inner wall tapers from said midpoint to said top;

a grate complementary to and configured for selectively coupling to said top of said tube;

a first recess extending into said tube from said top defining a first ridge, said first recess being complementary to said grate, wherein said first recess is positioned in said tube such that said first recess is positioned for inserting said grate for resting on said first ridge for coupling said grate to said tube;

a pipe coupled to and axially positioned in said tube, said pipe having an upper end and a lower end, said upper end and said lower end being closed, said pipe being circularly shaped when viewed longitudinally, said pipe being internally threaded proximate to said upper end and said lower end;

a second recess positioned in said inner wall of said tube proximate to said midpoint defining a second ridge;

at least one flange coupled to and extending radially from said pipe, said at least one flange being complementary to said second recess, wherein said second recess is positioned in said tube such that said second recess is positioned for inserting said at least one flange such that said at least one flange is positioned for sealably coupling to said inner wall and said second ridge for coupling said pipe to said tube;

a pair of caps complementary to said upper end and said lower end of said pipe such that said caps are selectively couplable singly to said upper end and said lower end of said pipe for closing said upper end and said lower end for retaining said first ball and said second ball within said pipe;

at least one gasket coupled to an inner surface of said pipe defining an upper chamber and a lower chamber;

a separation positioned radially through said pipe substantially equally distant from said upper end and said lower end such that said pipe comprises first section and a second section, wherein said separation is positioned in said pipe such that said first section and said second section are separable for inserting into and removing from said tube, said at least one gasket comprising a first gasket and a second gasket, said at least one flange comprising a first flange and a second flange, said first gasket and said first flange being coupled to said first section of said pipe, said second gasket and said second flange being coupled to said second section of said pipe;

a plurality of penetrations positioned through said pipe, wherein said penetrations are positioned in said pipe such that said penetrations are configured for flowing of gasses and liquids from said tube into said pipe, said penetrations being positioned proximate to and bracketing said at least one gasket such that said pipe is solid distal to said at least one gasket;

a first ball and a second ball, said first ball being positioned in said upper chamber, said second ball being positioned in said lower chamber, said first ball and said second ball being less dense than water, wherein said first ball is positioned in said upper chamber such that said first ball is configured for seating in said at least one gasket in the absence of liquids for closing said at least one gasket for preventing the gasses from escaping through said top of said tube and for floating in the presence of liquids entering said tube from said top for opening said at least one gasket for permitting the flowing of the liquids to the drain line, wherein said second ball is positioned in said lower chamber such that said second ball is configured for floating in the presence of liquids entering said tube from the drain line for closing said at least one gasket for preventing the flowing of the liquids through said top of said tube, said first ball and said second ball being substantially circumferentially complementary to said pipe; and wherein said separation is positioned in said pipe such that said first section and said second section are separable for inserting into and removing from said tube, wherein said pipe is internally threaded such that said caps are positioned for selectively couplable singly to said upper end and said lower end of said pipe for closing said upper end and said lower end for retaining said first ball and said second ball within said pipe, wherein said second recess is positioned in said tube such that said second recess is positioned for inserting said at least one flange such that said at least one flange is positioned for sealably coupling to said inner wall and said second ridge for coupling said pipe to said tube, wherein said first recess is positioned in said tube such that said first recess is positioned for inserting said grate for resting on said first ridge for coupling said grate to said tube, wherein said penetrations are positioned in said pipe such that said penetrations are configured for flowing of gasses and liquids from said tube into said pipe, wherein said first ball is positioned in said upper chamber such that said first ball is configured for seating in said at least one gasket in the absence of liquids for closing said at least one gasket for preventing the gasses from escaping through said top of said tube and for floating in the presence of liquids entering said tube from said top for opening said at least one gasket for permitting the flowing of the liquids to the drain line, wherein said second ball is positioned in said lower chamber such that said second ball is configured for floating in the presence of liquids entering said tube from the drain line for closing said at least one gasket for preventing the flowing of the liquids through said top of said tube.

\* \* \* \* \*